(12) United States Patent
Miyajima

(10) Patent No.: US 8,015,288 B2
(45) Date of Patent: Sep. 6, 2011

(54) VIRTUAL SYSTEM AND METHOD IN A VIRTUAL SYSTEM

(75) Inventor: Hiroaki Miyajima, Tokyo (JP)

(73) Assignee: NEC Corporation, Tokyo (JP)

( * ) Notice: Subject to any disclaimer, the term of this patent is extended or adjusted under 35 U.S.C. 154(b) by 186 days.

(21) Appl. No.: 12/392,681

(22) Filed: Feb. 25, 2009

(65) Prior Publication Data

US 2009/0222542 A1 Sep. 3, 2009

(30) Foreign Application Priority Data

Feb. 29, 2008 (JP) ................................. 2008-051329

(51) Int. Cl.
*G06F 15/16* (2006.01)
(52) U.S. Cl. ...................................................... 709/225
(58) Field of Classification Search .................. 709/223, 709/225
See application file for complete search history.

(56) References Cited

U.S. PATENT DOCUMENTS

2006/0090136 A1* 4/2006 Miller et al. .................. 715/734

FOREIGN PATENT DOCUMENTS

| JP | 1997233094 A | 9/1997 |
| JP | 2001127822 A | 5/2001 |
| JP | 2007228098 A | 9/2007 |
| WO | 02086712 A | 10/2002 |

* cited by examiner

*Primary Examiner* — Wing Chan
*Assistant Examiner* — Andrew Woo

(57) ABSTRACT

A virtual system, which realizes virtual computing environments for performing communication processing, includes a user virtual machine which is provided as a virtual machine environment to be used by users, and a service virtual machine which has a physical communication interface with a real network for communication between the real network and the user virtual machine, provides a virtual communication interface with the user virtual machine by Ethernet (registered trademark), and performs an interface conversion process for the communication between the real network and the user virtual machine if the physical communication interface is not by using Ethernet (registered trademark), in which the physical communication interface is converted to an equivalent interface using Ethernet (registered trademark).

23 Claims, 9 Drawing Sheets

VIRTUAL SYSTEM AND METHOD IN A VIRTUAL SYSTEM

This application is based upon and claims the benefit of priority from Japanese patent application No. 2008-051329, filed on Feb. 29, 2008 the disclosure of which is incorporated herein in its entirety by reference.

TECHNICAL FIELD

The present invention relates to a virtual system and a method in the virtual system, and particularly relates to a virtual system which separates a part of process functions of communication for network access from user environment.

BACKGROUND ART

In accordance with rapid development of the internet in recent years, the network access environment from user' premises such as ADSL (Asymmetric Digital Subscriber Line), FTTH (Fiber To The Home) and CATV (Cable Television), and the network access environment in the public represented by widely spread APs (Access Points) of wireless LAN (Local Area Network) system are also being well developed and maintained. Therefore, an opportunity is increasing for the portable computer such as a notebook type personal computer, which stores important information and also can obtain important information via a communication network, being moved outside the intranet of own organization and connected to an outside communication network other than the intranet. Here, the intranet is an internal network which is constructed by some kind of organization such as enterprises and corporations on their own for their internal communication use, and security of communication inside the network is strictly managed.

As a possible problem which might happen when the portable computer is moved outside the intranet and connected to the outside communication network, it is pointed out that a security accident of outflow of important information stored in the portable computer outside would occur.

Therefore, in order to manage the security strictly in the organization, a security administrator of the organization might desire to take necessary countermeasures such as prohibiting to use the portable computer in a communication network which is other than the intranet, or even it is allowed to use in other network, limiting to use only for communication by using a virtual private network (VPN), or changing functional setting in the portable computer to perform any filtering on communication contents.

However, it is difficult for most users to perform functional setting change of the operating system (OS) in the portable computer, or to install the security software of VPN or the like in the portable computer and change its functional setting properly according to the network to be used by the portable computer. Accordingly, it could be possible that the security administrator performs appropriate functional setting to the portable computer instead of the user. However, a software environment of the operating system (OS) and the application system (AP) employed in the portable computer used in the organization is full of variety. Accordingly, it can be said that it is also difficult for the security administrator to perform appropriate functional setting to all portable computers used in the organization. Even if the security administrator can perform appropriate functional setting to all portable computers, there is another possibility that a user of the portable computer may disable accidentally or intentionally such functional setting performed by the security administrator.

As a method of solving such a management problem for portable computers in the organization and a network security problem, a virtual system is considered to be one of solutions.

The virtual system is a system to realize computing environments virtually, and includes a virtual machine (VM) and a hypervisor. The virtual machine (VM) is the computing environments virtually realized, and the hypervisor performs management of a plurality of virtual machines and also performs management of resources or the like of a real computer system. The hypervisor is also called a virtual machine monitor (VMM). In the virtual system, a special virtual machine called a service VM performs control of real devices and management interfaces of the virtual system. However, the service VM may unite with the hypervisor. The virtual machine for user's environment is called a user VM.

When the virtual system is used, communication processing with an external network can be performed by the service VM, not the user VM. And, the user is positioned as an administrator of the operating system (OS) on the user VM, and the security administrator or the like can be positioned as an administrator of the service VM and the hypervisor. As a result, the range of management to be performed by the security administrator can be limited and reduced. Also, the management load of the security administrator can be reduced by sharing the environment on the service VM.

In the virtual system, when network access is performed by a user using the user VM, a virtual communication device provided in the user VM is used. The virtual communication device has an address used for communication like a real communication device has. As the address used for this communication, there is "MAC address (Media Access Control address)" for media access control on the data link layer used by Ethernet (registered trademark).

In a closed network like a LAN (Local Area Network), the MAC address is often used as a part of the user's identification information. Because a unique value is given to the MAC address for each real communication device when it is manufactured, it is not so difficult for the real communication device to make it an object for managing. However, in case of the virtual communication device, because the address like a MAC address is determined when a connection using the virtual communication device is generated, there is a problem that it is troublesome to manage the address like a MAC address as a part of the identification information, and it is considered that any method to solve this problem is needed.

As another address used for communication, there is "IP (Internet Protocol) address". It is necessary to assign an IP address to the virtual communication device of the user VM when the service VM performs any operation relating to the real network in the communication processing in which the IP address of the real communication device is involved. In this case, different IP address is needed for the virtual communication device of the user VM in addition to the IP address of the real communication device. However, it may not be able to obtain a plurality of IP address in a certain type of network. In case a plurality of IP address are not obtained, it can be solved by giving a temporary IP address to the virtual communication device and address translation such as NAT (Network Address Translation) is performed by the service VM. However, it may not be able to perform the address translation in a certain type of service protocol, and it is considered that any method to obtain a plurality of IP address is needed.

As a related art, a technology about Network Access Arbitrator which can perform a change over function between different Network Access Technologies such as Wireless LAN, token ring and Ethernet (registered trademark) or the like without stopping an active network application or without disconnecting an active session being used is disclosed in Japanese Patent Application Laid-Open No. 2001-127822.

This Network Access Arbitrator is a virtual network adapter driver which locates between the data link layer and the network layer of standard OSI (Open Systems Interconnection) protocol stack, and controls necessary change over function between different Network Access Technologies. Because all computer network applications are controlled at a layer upper than the network layer, all application using a network service (connection or connectionless) provided by the network layer continues without disconnecting those active network sessions when the Network Access Arbitrator carries out the change over function between different Network Access Technologies.

A network function proxy of an embedded OS (Operating System) simulator which supports software development for an embedded equipment is disclosed in Japanese Patent Application Laid-Open No. 2007-228098.

In this related art, the network function proxy, which enables communication between the embedded OS simulator and the host OS of a general-purpose computer on which this simulator itself is operating, is realized without having an influence on an existing network device driver of the host OS.

The network function proxy includes a network function proxy part which provides the alternate function of network function, a packet distribution part which judges whether a destination of packet data transmitted from the embedded OS simulator is the general-purpose computer on which the embedded OS simulator is operating or an external network, and a bridge module having functions to serve a network device driver to the network layer of OS of the general-purpose computer and deliver packet data.

A virtual network system which performs data communication in a plurality of LAN segments is disclosed in Japanese Patent Application Laid-Open No. 1997-233094. In particular, this technology is effective by applying to a virtual network system which performs the data communication efficiently among a plurality of emulated LAN which emulates existing LAN on the ATM (Asynchronous Transfer Mode) network.

In this related art, it includes the selecting means which selects one of cell assembling processes of a LAN emulation process and a native mode ATM process for each packet created by protocol which operates under higher layers than the network layer, the LAN emulation means which performs the LAN emulation process and creates ATM cells from a MAC frame having been assembled from the packet, and the native mode ATM means which performs the native mode ATM process and creates ATM cells direct from the packet. The selecting means selects the LAN emulation process or the native mode ATM process, the ATM cells are created by the LAN emulation means or the native mode ATM means by the selected result, and data communication is performed by created ATM cells.

Virtual network system and method in a processing system is disclosed in PCT publication No. WO 02/086712 A1.

According to this related art, a method and system for emulating a switched Ethernet local area network are provided. A plurality of computer processors and a switch fabric and point-to-point links to the processors are provided. Virtual interface logic establishes virtual interfaces over the switch fabric and point-to-point links. Each virtual interface defines a software communication path from one computer processor to another computer processor via the switch fabric. Ethernet driver emulation logic executes on at least two computer processors, and switch emulation logic executes on at least one of the computer processors. The switching emulation logic establishes a virtual interface between the switch emulation logic and each computer processor having Ethernet driver emulation logic executing thereon to allow software communication between them.

SUMMARY

An exemplary object of the present invention is to provide a virtual system which can improve the security in use of portable computers in any arbitrary network environment, and can suppress increase of management load for improving the security.

A virtual system according to an exemplary aspect of the invention includes a user virtual machine which is provided as a virtual machine environment to be used by users, and a service virtual machine which has a physical communication interface with a real network for communication between the real network and the user virtual machine, provides a virtual communication interface with the user virtual machine by Ethernet (registered trademark), and performs an interface conversion process for the communication between the real network and the user virtual machine if the physical communication interface is not by using Ethernet (registered trademark), in which the physical communication interface is converted to an equivalent interface using Ethernet (registered trademark).

A method in the virtual system, which realizes virtual computing environments for performing communication processing by a user virtual machine for user's environment and a service virtual machine having a physical communication interface with a real network, according to an exemplary aspect of the invention includes a providing step for providing a virtual communication interface between the user virtual machine and the service virtual machine by Ethernet (registered trademark), and a performing step for performing an interface conversion process for communication between the real network and the user virtual machine if the physical communication interface is not by using Ethernet (registered trademark), wherein the physical communication interface is converted, by the interface conversion process, to an equivalent interface to the virtual communication interface using Ethernet (registered trademark).

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

In a virtual system according to an exemplary embodiment of the present invention, it is supposed that a virtual communication device provided for the user VM is a virtual NIC (Network Interface Card) and the communication system employed on the data link layer of the user VM is performed by Ethernet (registered trademark). When the communication system employed on the data link layer of the real network is performed by Ethernet (registered trademark), the process operation for giving the same MAC address to both of the real NIC and the virtual NIC is automatically performed.

When the communication system employed on the data link layer of the real network is not performed by Ethernet (registered trademark), the communication system of the real network side is converted into the communication system by using Ethernet (registered trademark) for the internal communication of the virtual system. That is, a real communication interface which is not Ethernet (registered trademark) is converted to an equivalent interface of a virtual communication interface which is provided for the internal communication of the virtual system. In that case, proxy ARP which is known as substitution means to act as a proxy for giving an answer for address resolution protocol (ARP) is applied to the virtual NIC of the user VM. Here, the proxy is a computer which locates a boundary of the intranet and the internet, and establishes connection to the internet as substitution means for acting as a computer used in the intranet which cannot perform a direct connection to the internet, or software which realizes the function thereof.

As IP address information for the virtual NIC of the user VM, the IP address information on the real network is used, i.e., "reuse of IP address". This can be realized by applying a DHCP (Dynamic Host Configuration Protocol) server used for distributing an IP address to the user VM environment. That is, the IP address of the real network is set to the DHCP server and the DHCP is dedicatedly used for the user NIC.

Further, the processing method to be performed for communication from the virtual NIC of the user VM is judged based on contents of Ethernet (registered trademark) frame and its payload. The processing method to be performed for communication from the real network is judged based on contents of Ethernet (registered trademark) frame or IP packet received at the real NIC which is connected to the real network.

A first exemplary embodiment of the present invention will be described with reference to accompanying drawings below.

Figure 1:
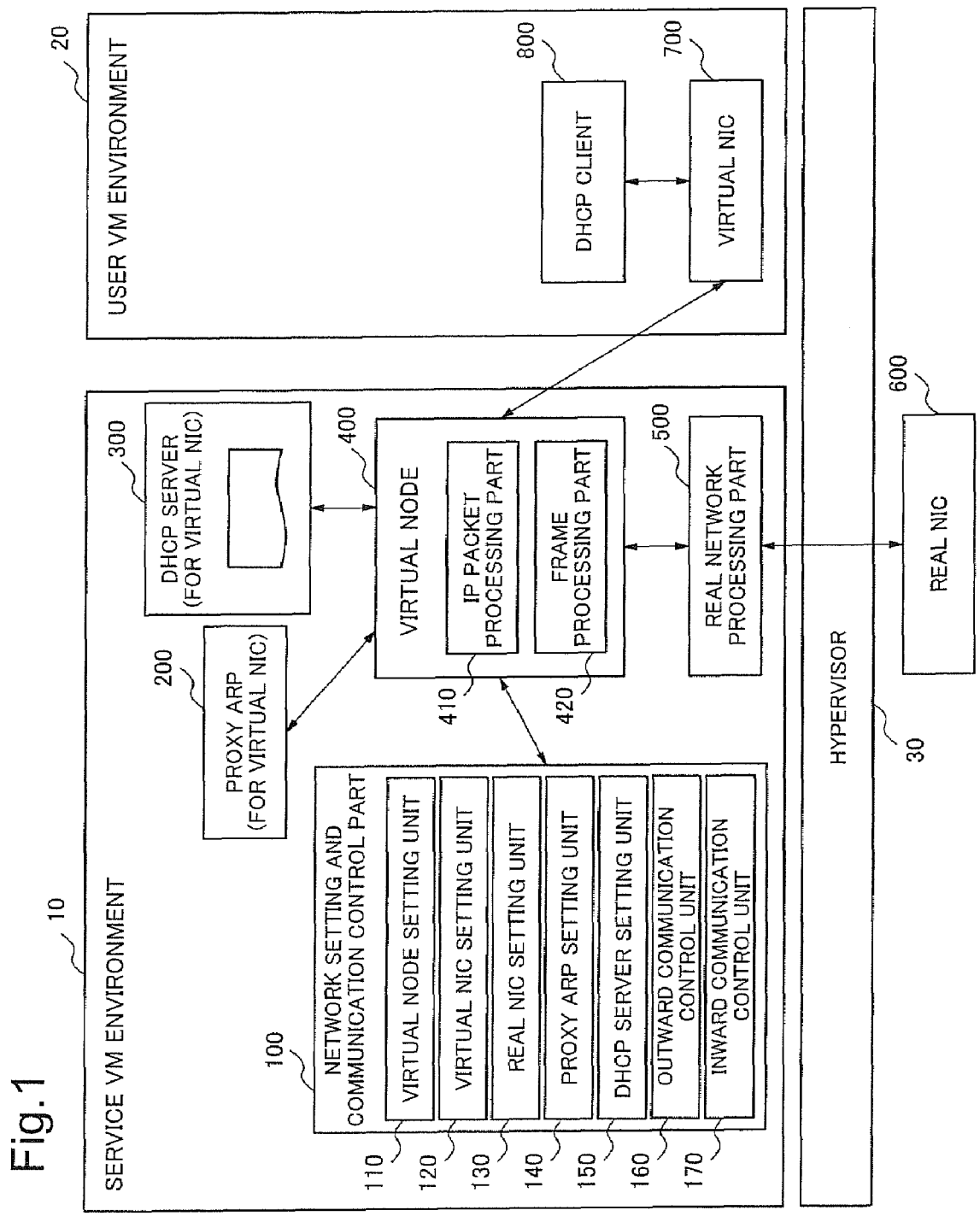
FIG. 1 is a block diagram showing a configuration of the virtual system according to an exemplary embodiment.

FIG. 1 is a block diagram showing a configuration of the virtual system according to the first exemplary embodiment of the present invention. Referring to FIG. 1, the virtual system according to the exemplary embodiment includes a service VM environment 10 which controls real devices and management interfaces of the virtual system, a user VM environment 20 which is the virtual machine operated by users and a hypervisor 30 which performs management of these virtual machines and resource control or the like of a real computer system. A real NIC (network interface card) 600 which is connected to the real network is included as a real communication device for use of communication with the external network. And, the service VM environment 10 includes a network setting and communication control part 100, a proxy ARP 200, a DHCP server 300, a virtual node 400 and a real network processing part 500, and the user VM environment 20 includes a virtual NIC (Network Interface Card) 700 and a DHCP client 800.

The network setting and communication control part 100 performs various functions setting necessary for network function and controls communication for the virtual system. The proxy ARP 200 realizes a function of the proxy ARP for the virtual NIC 700 of the user VM environment 20. The function of the proxy ARP performs to send back an ARP (Address Resolution Protocol) response, instead of a receiving end host, to a host which has transmitted an ARP request to the receiving end host. By using the function of the proxy ARP, it is possible for a certain system which is not directly connected to a LAN to pretend as if the system is being connected to the LAN to other systems which are connected on the same LAN. The DHCP server 300 is a Dynamic Host Configuration Protocol (DHCP) server for the virtual NIC 700 of the user VM environment 20. The virtual node 400 is an opposed node of the user VM environment 20, and it communicates with the virtual NIC 700 by performing control processing necessary for the communication. The real network processing part 500 deals with communication functions relating to the real network being connected to this virtual system. The real NIC 600 physically exists, and is connected to the real network actually. The virtual NIC 700 is provided for a virtual network. Here, it is supposed that the virtual NIC 700 is used by the DHCP client 800 of the user VM environment 20.

Further, the real network is formed by physical communication lines, and it does not matter whichever the lines are wired or wireless. And, as an antonym of terminology as "virtual", terminology as "real" is used. The VM environment means software programs or the like which emulates hardware. Here, as the VM environment, the user VM environment 20 and the service VM environment 10 exist.

Each function of the network setting and communication control part 100, the proxy ARP 200, the DHCP server 300, the virtual node 400 and the real network processing part 500 is realized by the software functions in the service VM environment 20 of the virtual system. CPU (Central Processing Unit) or a microprocessor is considered as an example of hardware which executes the software functions corresponding to the network setting and communication control part 100, the proxy ARP 200, the DHCP server 300, the virtual node 400 and the real network processing part 500. Semiconductor integrated circuit (IC) or the like which functions as each of the network setting and communication control part 100, the proxy ARP 200, the DHCP server 300, the virtual node 400 and the real network processing part 500 is also considered as hardware. Further, the network setting and communication control part 100, the proxy ARP 200, the DHCP server 300, the virtual node 400 and the real network processing part 500 can be handled by same hardware.

The real NIC 600 is a hardware device. The virtual NIC 700 is an element of the virtual machine. Among configuration elements as described above, the network setting and communication control part 100 is the main element peculiar to this exemplary embodiment. However, actually, it is not limited to these examples.

The network setting and communication control part 100 includes a virtual node setting unit 110, a virtual NIC setting unit 120, a real NIC setting unit 130, a proxy ARP setting unit 140, a DHCP server setting unit 150, an outward communication control unit 160 and an inward communication control unit 170.

The virtual node setting unit 110 performs various functions setting necessary for the virtual node 400. The virtual NIC setting unit 120 performs various functions setting necessary for the virtual NIC 700. The real NIC setting unit 130 performs various functions setting necessary for the real NIC 600. The proxy ARP setting unit 140 performs various functions setting necessary for the proxy ARP 200 for the virtual NIC 700 of the user VM environment 20. The DHCP server setting unit 150 performs various functions setting necessary for the DHCP servers 300 for the virtual NIC 700 of the user VM. The outward communication control unit 160 handles communication transmitted from the virtual NIC 700 of the user VM environment 20 to one of the proxy ARP 200, the DHCP servers 300 and the real network processing part 500 via the virtual node 400. The inward communication control unit 170 handles communication transmitted from the real NIC 600 to the virtual NIC 700 of the user VM environment 20 via the real network processing part 500 and the virtual node 400.

The virtual node 400 includes an IP packet processing part 410 and a frame processing part 420.

The IP packet processing part 410 deals with processing of IP packets. The frame processing part 420 deals with processing of Ethernet (registered trademark) frames.

Next, operation of the exemplary embodiment using the apparatus constituted as above will be described.

In FIG. 1, the virtual system according to the exemplary embodiment starts in order of the hypervisor 30 and the service VM environment 10. The service VM environment 10 is the service VM and its operating environment. As an example of the operating environment, the operating system (OS) and application system (AP) are considered. When the service VM environment 10 is started, the real network processing part 500 initializes the real NIC 600 which accommodates physical communication lines of the real network. As a result, the service VM environment 10 is connected to the real network, and it can use the real network for communication, and address information (IP address information) on the network layer is obtained and set. For connecting the real network to the virtual system in this case, several kinds of connection are applicable such as a connection by Ethernet (registered trademark) or IEEE802.3, a serial connection by PPP (Point to Point Protocol), a connection by PPPoE (PPP over Ethernet (registered trademark)) and a connection by Wi-Fi (wireless LAN) or the like. Also, as a method for obtaining the IP address information, several kinds of method are applicable such as a method by using DHCP, a method by using IPCP (Internet Protocol Control Protocol) which is a sub protocol of PPP, and even a manual setting method which sets fixed address manually is applicable. In the exemplary embodiment, these methods as above are not designated in particular, and it is supposed that the real network is appropriately used by administrators or users.

Figure 2:
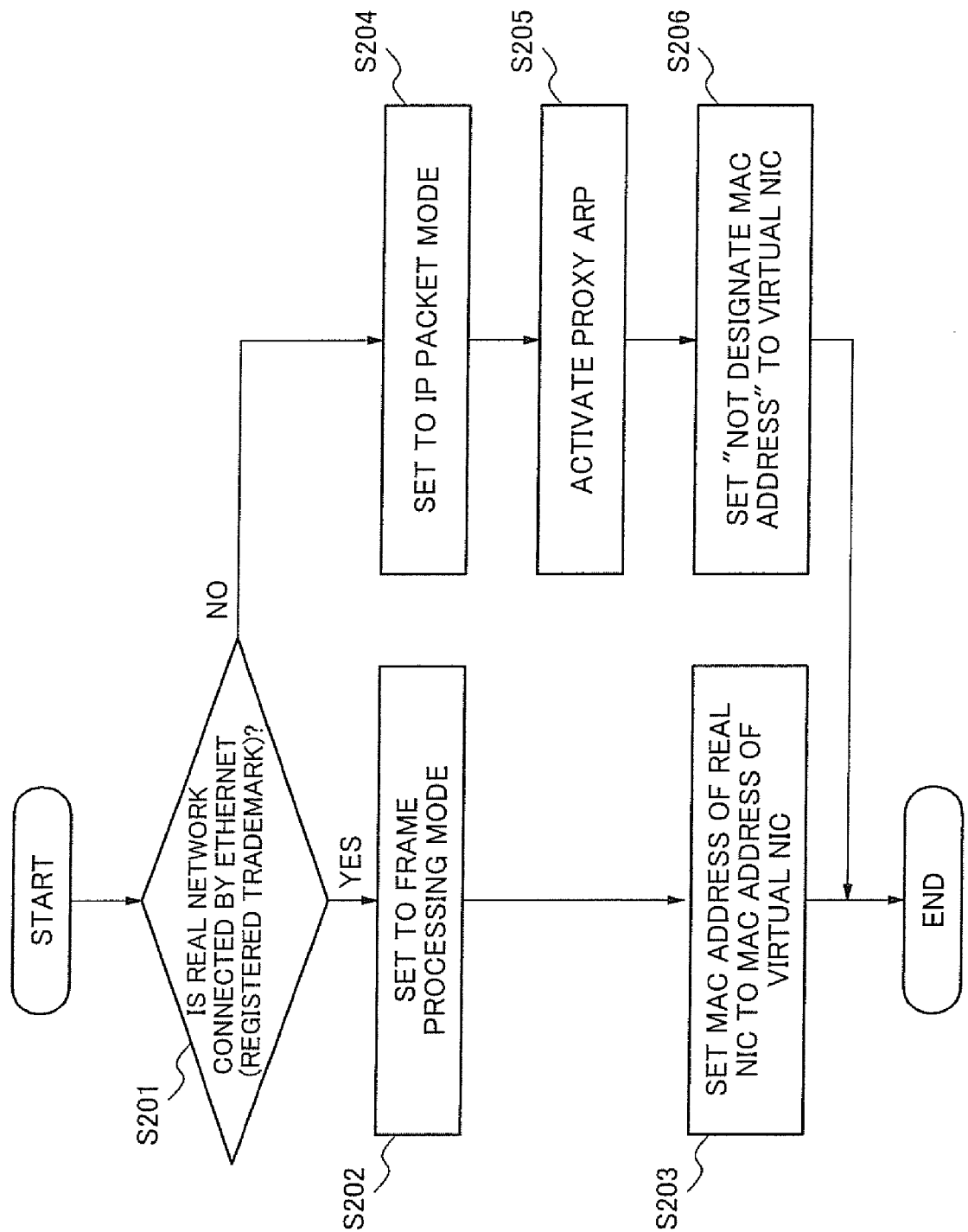
FIG. 2 is a flowchart showing process operation performed before the user VM is activated.

FIG. 2 shows a flowchart of operation performed by the network setting and communication control part 100 with its component prior to starting the user VM environment 10 after the real network having been connected. In this operation, the network setting and communication control part 100 performs functions setting necessary for the virtual node 400 depending on connection environment with the real network. Moreover, the network setting and communication control part 100 performs necessary functions setting, which corresponds to the functions setting having been set to the virtual node 400, for the virtual NIC 700 which acts as an opposing device to the virtual node 400.

(1) Step S201

The network setting and communication control part 100 determines whether the real network is connected by "direct Ethernet (registered trademark)" or not. The network setting and communication control part 100 acquires information on whether the real network is connected by the direct Ethernet (registered trademark) or not from the real network processing part 500. Here, the direct Ethernet (registered trademark) means that the communication system employed on the data link layer of the real network is Ethernet (registered trademark) or IEEE802.3. Although Ethernet (registered trademark) is used, communication like using PPPoE, which uses PPP on the data link layer communication, is not included in the direct Ethernet (registered trademark). Here, when the real network processing part 500 is connected to the real NIC 600, the virtual node setting unit 110 acquires information which indicates whether the real network is the direct Ethernet (registered trademark) or not from the real network processing part 500.

(2) Step S202

In case the real network is connected by the direct Ethernet (registered trademark), the virtual node setting unit 110 sets the virtual node 400 to operate under frame processing mode. The frame processing mode will be described later. Here, the virtual node 400 is a communication node which is opposing to the virtual NIC 700, and it is supposed that the MAC address given to the virtual node 400 is set by the virtual system appropriately in its function.

(3) Step S203

Figure 3:
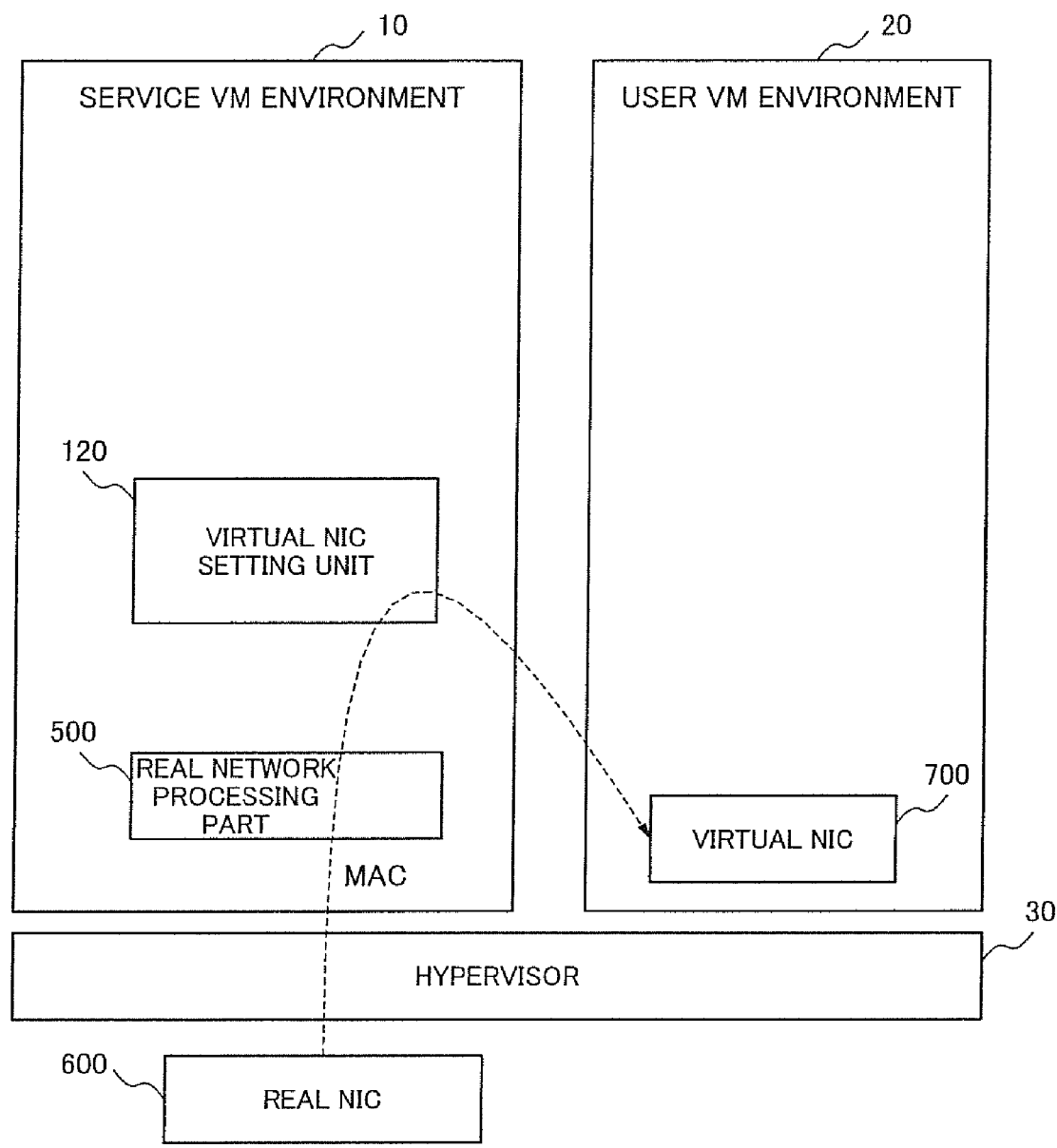
FIG. 3 is a conceptual diagram showing an example for setting MAC address to the virtual NIC.

The virtual NIC setting unit 120 acquires the MAC address of the real NIC 600 from the real network processing part 500 and defines it as a MAC address of the virtual NIC 700. As a result, the MAC address of the virtual NIC 700 becomes identical to the MAC address of the real NIC 600, i.e., the same value as the MAC address of the real NIC 600 is defined to the MAC address of the virtual NIC 700. FIG. 3 indicates a direction for setting the MAC address. As shown in FIG. 3, when the real network processing part 500 is connected to the real NIC 600, the virtual NIC setting unit 120 acquires the MAC address of the real NIC 600 via the real network processing part 500 and defines the acquired MAC address as the MAC address of the virtual NIC 700. However, as of this, the user VM environment 20 has not yet started on its operation, and only definition of MAC address for the virtual NIC 700 of the user VM environment 20 is reserved to be changed.

(4) Step S204

On the other hand, when the real network is not the direct Ethernet (registered trademark), the virtual node setting unit 110 sets the virtual node 400 to operate under IP packet processing mode. The IP packet processing mode will be described later.

(5) Step S205

The proxy ARP setting unit 140 starts the proxy ARP 200 to operate. In later operation of the user VM environment 20, the user VM environment 20 will send an address resolution (ARP) requests via the virtual NIC 700 for acquiring a MAC address. At that time, this proxy ARP 200 will send back a response including the MAC address of the virtual node 400. The proxy ARP 200 is needed only the case where the data link layer of the real network is not Ethernet (registered trademark). A communication node on the real network responds to the ARP request in the case where the data link layer of the real network is Ethernet (registered trademark). Therefore, the proxy ARP 200 is not needed in that case.

(6) Step S206

The virtual NIC setting unit 120 performs functional setting of the virtual NIC 700 for designating the MAC address, and condition of this functional setting is set to "not designate". As a result, the MAC address of the virtual NIC 700 will be the value selected by its function of the virtual system.

Figure 4:
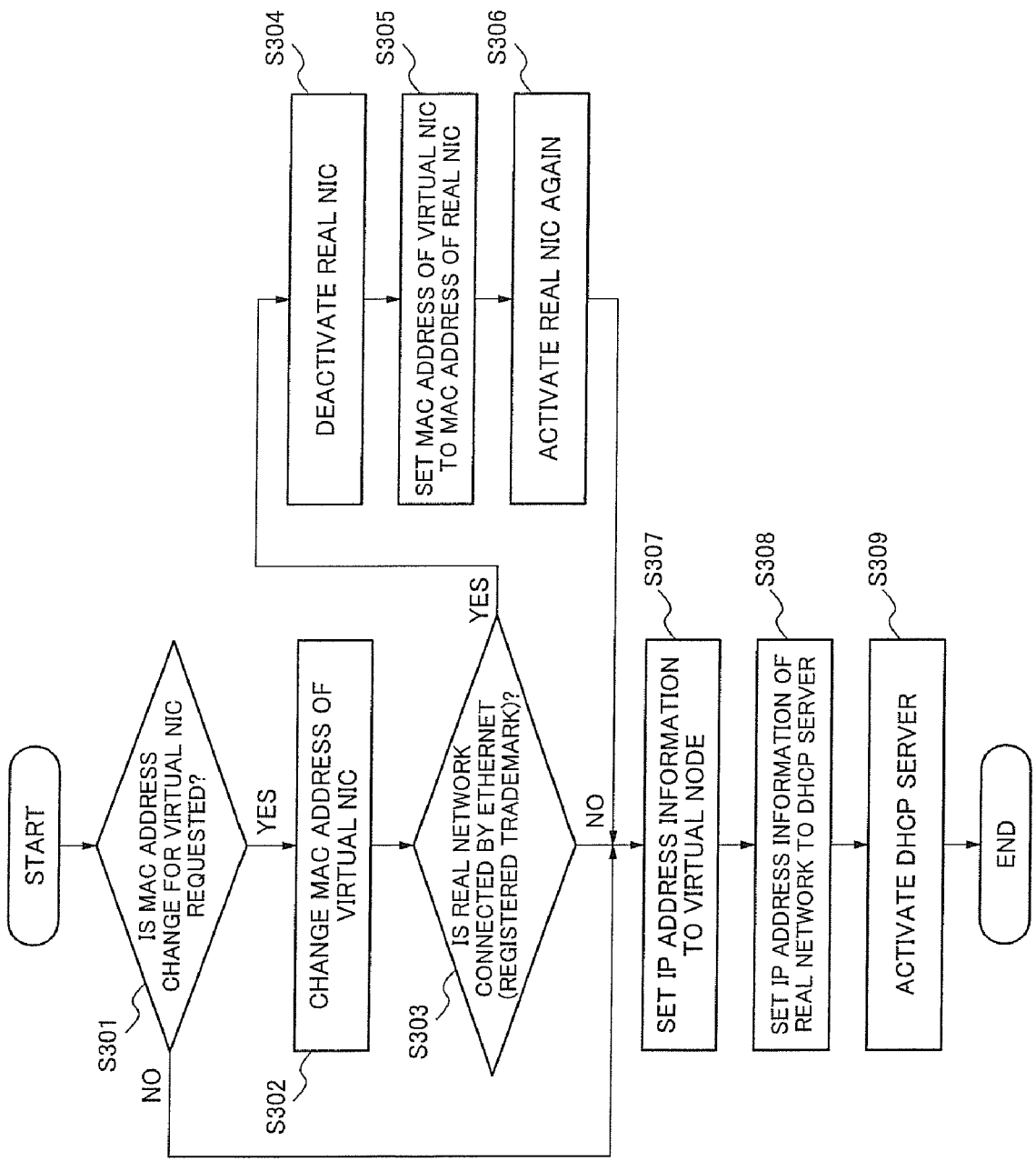
FIG. 4 is a flowchart showing process operation of the virtual NIC activation.

FIG. 4 is a flowchart of operation performed by the network setting and communication control part 100 with its component when the user VM environment 20 starts its operation and the virtual NIC 700 is activated. In this operation, the network setting and communication control part 100 performs various functions setting necessary for the user VM environment 20 to communicate with the external network via the service VM environment 10.

(1) Step S301

The network setting and communication control part 100 determines whether the user VM environment 20 is requesting change in the MAC address of the virtual NIC 700. Generally, as a MAC address to be assigned to an ordinary NIC, a certain of value is given as the MAC address of the NIC at the time of manufacturing the NIC (or given at the time of generating the NIC in case of the virtual system). However, it is possible that the operating system (OS) designates a value of the MAC address and changes the MAC address of the NIC. When the user VM environment 20 is requesting change in the MAC address of the virtual NIC 700, the virtual NIC setting unit 120 receives the request of change in the MAC address from the virtual NIC 700 via the virtual node 400.

(2) Step S302

When the user VM environment 20 is requesting change in the MAC address of the virtual NIC 700, the virtual NIC setting unit 120 changes the designation of MAC address of the virtual NIC 700 to the value which the user VM environment 20 has designated.

(3) Step S303

Figure 5:
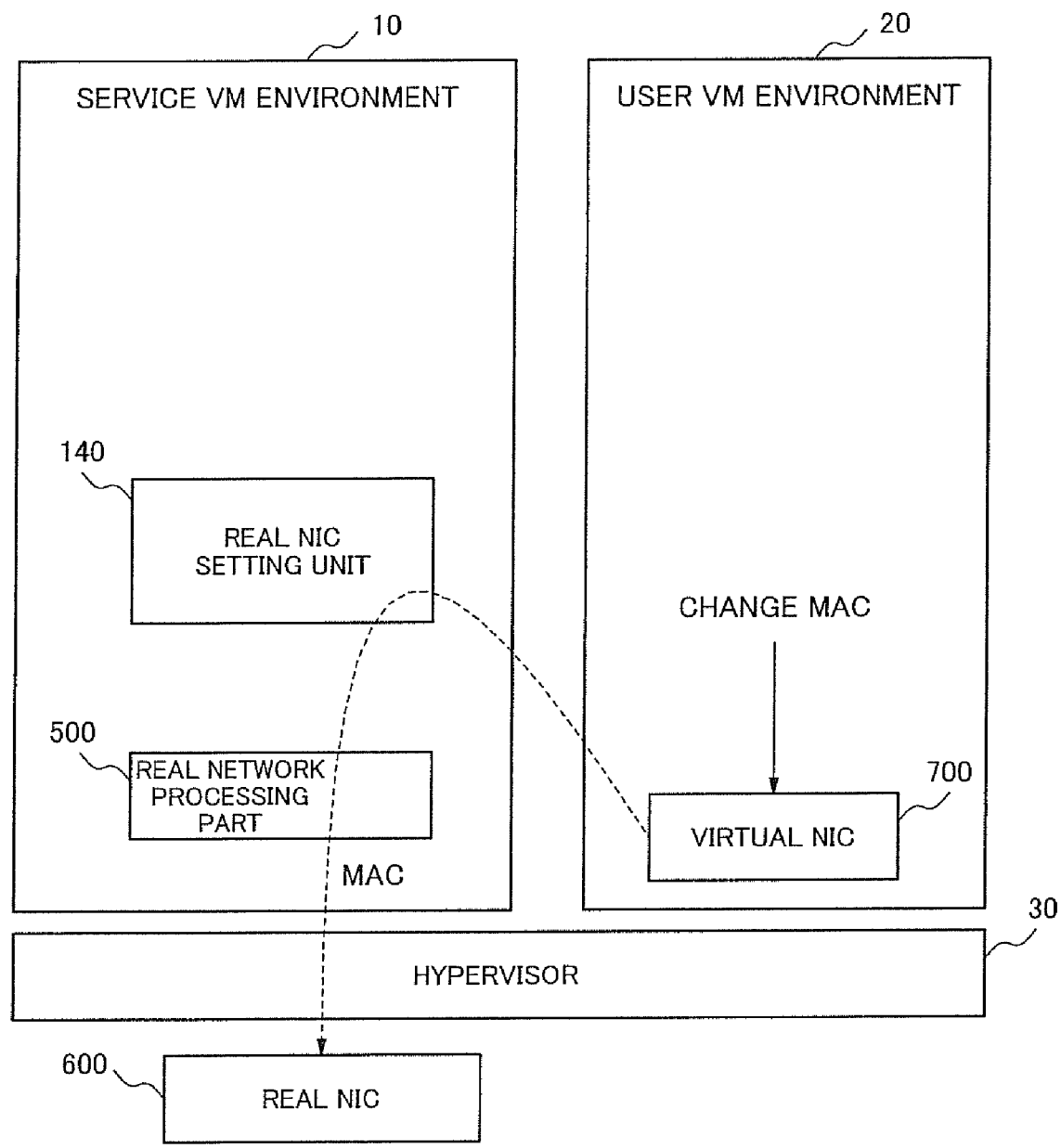
FIG. 5 is a conceptual diagram showing an example for setting MAC address to the real NIC.

The network setting and communication control part 100 determines whether the real network is connected by the direct Ethernet (registered trademark). This is the same conditional branch as Step S201 of FIG. 2. That is, the network setting and communication control part 100 acquires information on whether the real network is connected by the direct Ethernet (registered trademark) from the real network processing part 500. The virtual node setting unit 110 acquires information which indicates whether the real network is connected by the direct Ethernet (registered trademark) from the real network processing part 500 when the real network processing part 500 is connected to the real NIC 600. As this operation is performed after the MAC address of the virtual NIC 700 was changed in Step S302, if it is determined that the data link layer of the real network is connected by the direct Ethernet (registered trademark), the MAC address of the real NIC 600 should also be changed. Then, the real NIC setting unit 130 changes the MAC address of the real NIC 600, in the following steps of S304-S306, to the value of MAC address of the virtual NIC 700 which was changed in the previous step of S302. FIG. 5 shows a direction for setting the MAC address change.

(4) Step S304

When the real network is connected by the direct Ethernet (registered trademark), the real NIC setting unit 130 deactivates the real NIC 600 in order to perform the process of next step S305.

(5) Step S305

The real NIC setting unit 130 sets the same value as the MAC address of the virtual NIC 700 to the definition of MAC address for the real NIC 600.

(6) Step S306

The real NIC setting unit 130 activates again the real NIC 600. As a result, the MAC address of the virtual NIC 700 becomes identical to the MAC address of the real NIC 600, i.e., both of the MAC address of the virtual NIC 700 and the real NIC 600 contain the same value.

(7) Step S307

Next, the network setting and communication control part 100 activates operation on the network layer by setting IP address information to the virtual node 400 by the virtual node setting unit 110. In this case, the IP address information to be set to the virtual node 400 should be a different IP address with the same network address of the IP address set to the real network processing part 500 or the like, which is used in the real network, and this is selected appropriately. For example, if such a network address for the real network is "10.20.30.0/24" and the IP address used in the real network is "10.20.30.40", the network address of "10.20.30.0/24" and the IP address of "10.20.30.41" are selected for the virtual node 400. The IP address selected appropriately here may overlap with a certain IP address given to other communication node of the real network (double assign of IP address). However, this IP address is only used by the DHCP server 300 for DHCP protocol communication between the DHCP server 300 and the virtual NIC 700. And, the network setting and communication control part 100 so controls this IP address as not to be used for other communication. Therefore, there is no problem even if double assign of IP address has happened here.

(8) Step S308

By using the DHCP server setting unit 150, the network setting and communication control part 100 sets the IP address information of the real network held by the real network processing part 500 the like to the DHCP server 300 as the IP address information to be distributed by the DHCP server 300. The network setting and communication control part 100 limits a target, to which the DHCP server 300 distributes the IP address information, only to the virtual NIC 700. Therefore, the DHCP server 300 is a dedicated DHCP server for the virtual NIC 700.

(9) Step S309

The DHCP server setting unit 150 starts the DHCP server 300 to operate. As a result, when activation of the virtual NIC 700 is completed after this, the DHCP client 800 of the user VM environment 20 can acquires the IP address information from the DHCP server 300 by using DHCP protocol.

Figure 6:
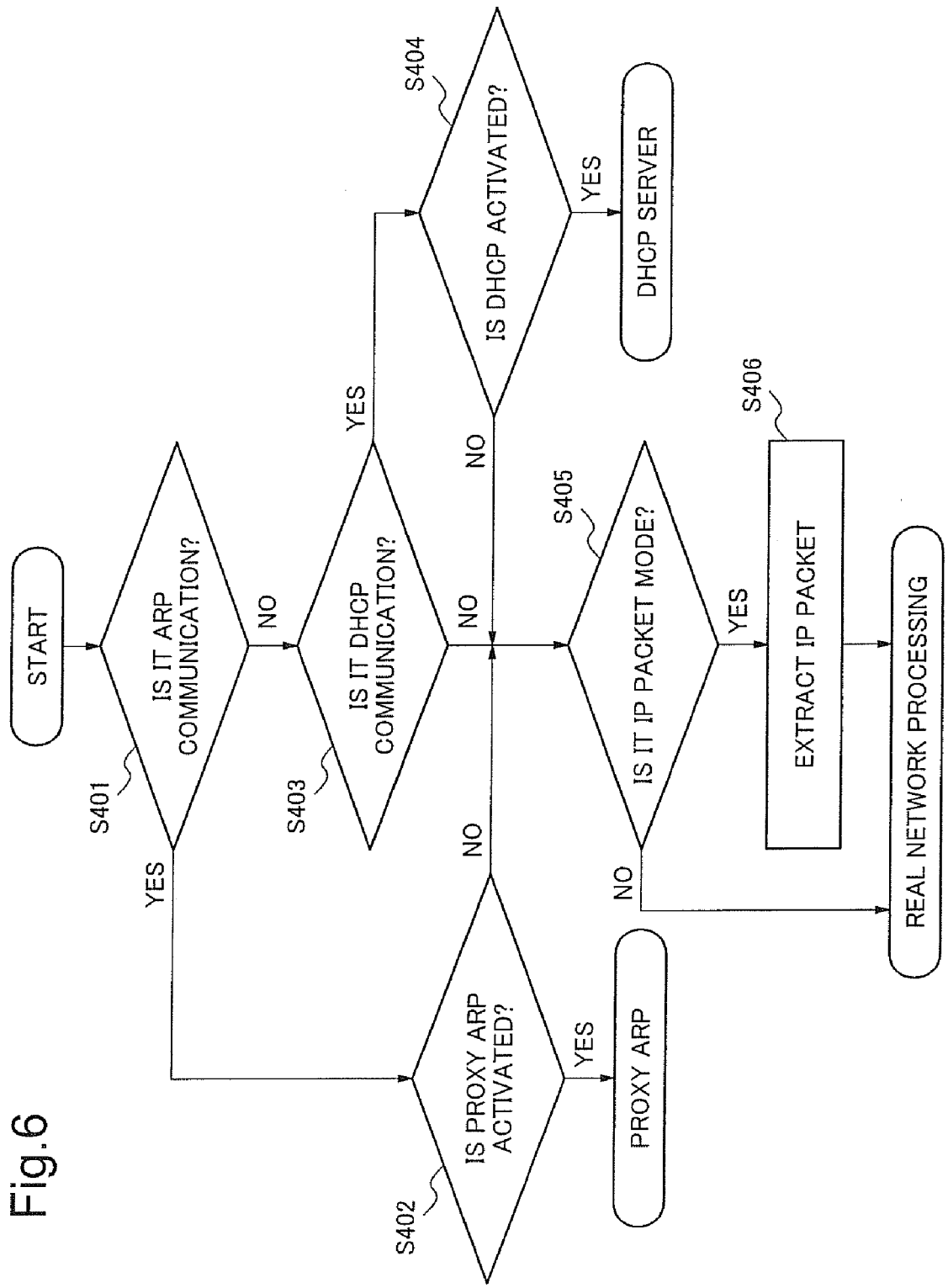
FIG. 6 is a flowchart showing process operation performed by the outward communication control part.

After preparatory operations for communication between the user VM environment 20 and the service VM environment has completed as above, the network setting and communication control part 100 performs operation for outward communication shown in FIG. 6 when an Ethernet (registered trademark) frame is transmitted from the user VM environment 20. FIG. 6 is a flowchart of operation which decides a destination of Ethernet (registered trademark) frame received from the user VM environment 20 to be transferred. The outward communication control unit 160 receives the Ethernet (registered trademark) frame, which the virtual NIC 700 has transmitted and reached the virtual node 400, as an input, and the outward communication control unit 160 judges the destination of Ethernet (registered trademark) frame to be transferred by discriminating communication category information included in the Ethernet (registered trademark) frame whether the destination is the proxy ARP 200, the DHCP server 300 or the real network processing part 500.

(1) Step S401

First, the outward communication control unit 160 determines whether the Ethernet (registered trademark) frame transmitted from the virtual NIC 700 is for the address resolution protocol (ARP) communication.

(2) Step S402

If the communication category information of the Ethernet (registered trademark) frame transmitted from the virtual NIC 700 is the address resolution protocol (ARP) communication, the outward communication control unit 160 determines whether the proxy ARP 200 is active state. When the proxy ARP 200 is active state, the Ethernet (registered trademark) frame is transmitted to the proxy ARP 200. In other words, the outward communication control unit 160 transmits the Ethernet (registered trademark) frame via the virtual node 400 to the proxy ARP 200 as a destination of the frame.

(3) Step S403

If the communication category information of the Ethernet (registered trademark) frame transmitted from the virtual NIC 700 is not the address resolution protocol (ARP) communication, the outward communication control unit 160 determines whether the communication category information of the Ethernet (registered trademark) frame from the virtual NIC 700 is the DHCP communication.

(4) Step S404

If the communication category information of the Ethernet (registered trademark) frame from the virtual NIC 700 is the DHCP communication, the outward communication control unit 160 determines whether the DHCP server 300 is active state. When the DHCP server 300 is active state, the Ethernet (registered trademark) frame is transmitted to the DHCP server 300. In this case, the outward communication control unit 160 transmits the Ethernet (registered trademark) frame via the virtual node 400 to the DHCP server 300 as the destination of the frame. When the destination of the Ethernet (registered trademark) frame to be transmitted is neither the proxy ARP 200 nor the DHCP server 300, the destination of the Ethernet (registered trademark) frame is the real network processing part 500.

(5) Step S405

The outward communication control unit 160 determines whether the virtual node 400 is set to operate under the IP packet processing mode.

(6) Step S406

When the virtual node 400 is set to operate under the IP packet processing mode, the outward communication control unit 160 extracts an IP packet from the Ethernet (registered trademark) frame and inputs it to the real network processing part 500. Actually, the virtual node 400 may extract the IP packet from the Ethernet (registered trademark) frame according to instruction from the outward communication control unit 160, and then inputs the extracted IP packet to the real network processing part 500. If the virtual node 400 is not set to operate under the IP packet processing mode but set to the frame processing mode, the outward communication control unit 160 inputs the Ethernet (registered trademark) frame to the real network processing part 500 just as it is.

Next, the frame processing mode and the IP packet processing mode of the virtual node 400 will be described with reference to FIGS. 7 and 8.

In the flowchart shown in FIG. 2, the virtual node setting unit 110 sets the virtual node 400 to operate under the frame processing mode (Step S202) or the IP packet mode (Step S204). FIG. 7 shows a conceptual diagram of operation under the frame processing mode, and FIG. 8 shows a conceptual diagram of operation under the IP packet processing mode.

Figure 7:
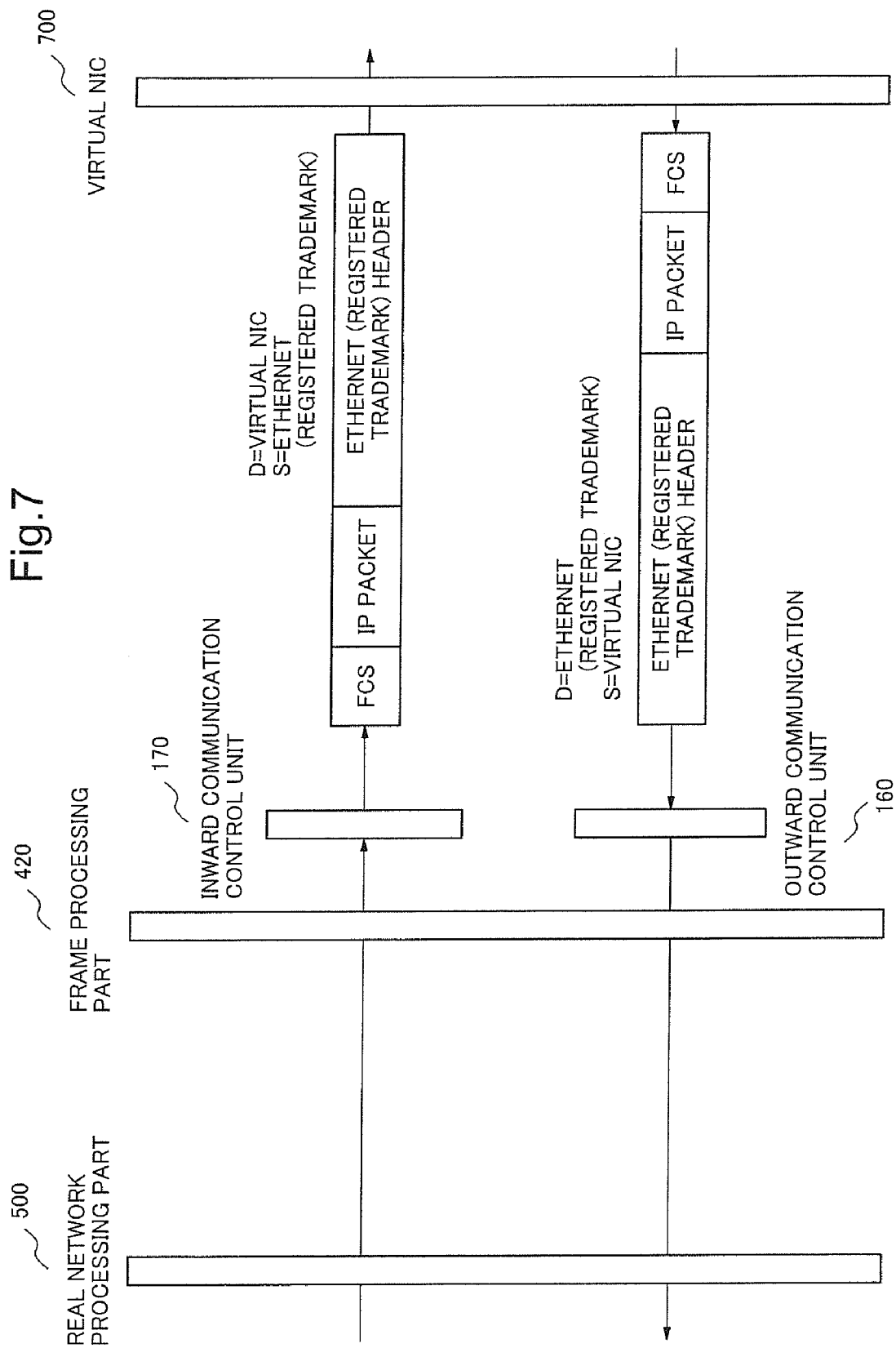
FIG. 7 is a conceptual diagram showing an example of the frame processing mode.

In case where the communication system employed on the data link layer of the real network is Ethernet (registered trademark), the frame processing mode shown in FIG. 7 is applied. The real network processing part 500 transfers the Ethernet (registered trademark) frame received from the real NIC 600 to the frame processing part 420 in the virtual node 400 as inward communication process. The frame processing parts 420 does not perform any processing to the Ethernet (registered trademark) frame in the inward communication process. In this exemplary embodiment, it is not necessary to set the real NIC 600 to Promiscuous Mode which is a mode for taking all data frames flowing on the network in the NIC. Therefore, the real NIC 600 accepts only data frames having a destination address of own NIC and a broadcast address. Accordingly, the destination address of the Ethernet (registered trademark) frame, which is processed by the frame processing part 420, is the MAC address of the virtual NIC 700, which is the same MAC address as the MAC address of the real NIC, or a broadcast address. Here, when the destination address is a broadcast address, the inward communication control unit 170 performs filtering process so that broadcast frames not to reach the DHCP server 300. And, this Ethernet (registered trademark) frame having the MAC address of the virtual NIC 700 is transferred to the virtual NIC 700. On the other hand, with respect to the outward communication process described in FIG. 6, the Ethernet (registered trademark) frame received from the virtual NIC 700 is inputted to the real network processing part 500 as it has been described by the flowchart in Step S405 (No) of FIG. 6.

Figure 8:
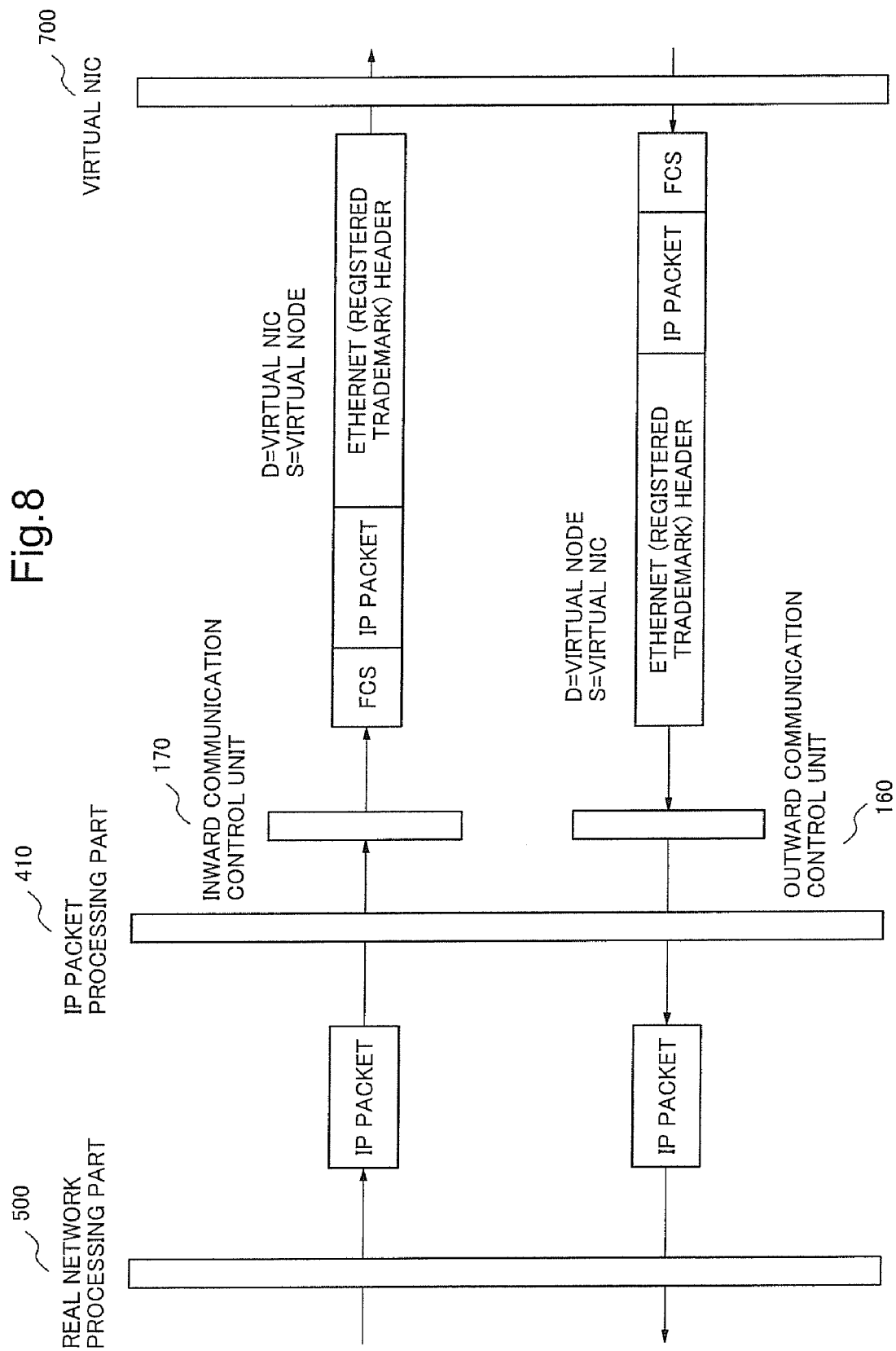
FIG. 8 is a conceptual diagram showing an example of the IP packet processing mode.

The IP packet processing mode shown in FIG. 8 is applied when the communication system employed on the data link layer of the real network is not Ethernet (registered trademark). In the inward communication process, the real network processing part 500 extracts an IP packet from the data frame conveyed on the data link layer and transfers the extracted IP packet to the IP packet processing part 410 of the virtual node 400. Then, the IP packet processing part 410 assembles an Ethernet (registered trademark) frame with adding the MAC address of the virtual node 400 as a sender address and the MAC address of the virtual NIC 700 as a destination address, and transmits the assembled Ethernet (registered trademark) frame to the virtual NIC 700. With respect to the Ethernet (registered trademark) frame transmitted from the virtual NIC 700 in the outward communication process, the outward communication control unit 160 handles the Ethernet (registered trademark) frame as described in the flowchart of FIG. 6, and the IP packet processed by the step of S406 is inputted to the real network processing part 500.

According to this exemplary embodiment, a part of the network processing can be separated from the user VM environment of the virtual machine effectively by the following reason.

One of reasons is that the process of making identical MAC address for the real NIC and the virtual NIC is automatically performed when the communication system employed on the data link layer of the real network is Ethernet (registered trademark). As a result, when the MAC address is being used as the user's identification information for service on the network, even if the user environment is formed by the virtual system, it is not necessary to change the information on the MAC address to be used as the identification information for service on the real network. Further, the real NIC is different from one used in an ordinary virtual system, i.e., Promiscuous Mode is not applied to the real NIC, because Ethernet (registered trademark) frames to be taken from the real network are those frames having own MAC address and broadcast MAC address. Heavy processing such as a process of MAC address conversion (MAT) for Ethernet (registered trademark) frame does not need to be performed.

Another reason is that the communication system employed on the data link layer of the real network is automatically converted to the communication system by using Ethernet (registered trademark) for the virtual NIC of the user VM. Therefore, even though the communication system employed on the data link layer of the real network is not Ethernet (registered trademark), the internal communication between the virtual node 400 and the virtual NIC of the user VM is always performed by Ethernet (registered trademark) basis. As a result, it is not necessary to change setting of functions for network control in the user environment of the virtual system according to the communication environment on the data link layer of the real network.

Further another reason is that the IP address information on the network layer of the real network is reused as the IP address information on the network layer of the virtual NIC. As a result, it is enough to have one IP address on the network layer of the real network, and address translation (NAT) process is not needed.

Next, the second exemplary embodiment will be described.

The real network processing part 500 of FIG. 1 deals with a virtual private network (VPN) connection in the second exemplary embodiment. As a data frame handled by VPN, an IP packet is common as used in IPSec (Security Architecture for Internet Protocol) or PPTP (Point-to-Point Tunneling Protocol). However, an Ethernet (registered trademark) frame can also be handled by the VPN as well as the IP packet. In this exemplary embodiment, a VPN processing is performed by the real network processing part 500 at the real network side and the virtual node 400 handles the Ethernet (registered trademark) frame or the IP packet like the first exemplary embodiment when the VPN connection is the subject to be processed on the real network.

In case of the second exemplary embodiment, the process step of S201 in FIG. 2 becomes a similar conditional branch for determining a type of communication system used in the real network. In this case, it is determined whether the real network is connected by "Ethernet (registered trademark) VPN (Virtual Private Network)". Other process steps of S202, S204 and S205 in FIG. 2 can also be applied just as it is in the second exemplary embodiment. In the process step of S203 in FIG. 2, a MAC address of the communication node of Ethernet (registered trademark) VPN is used to define a MAC address of the virtual NIC 700 instead of using a MAC address of the real NIC 600 in the second exemplary embodiment.

Figure 9:
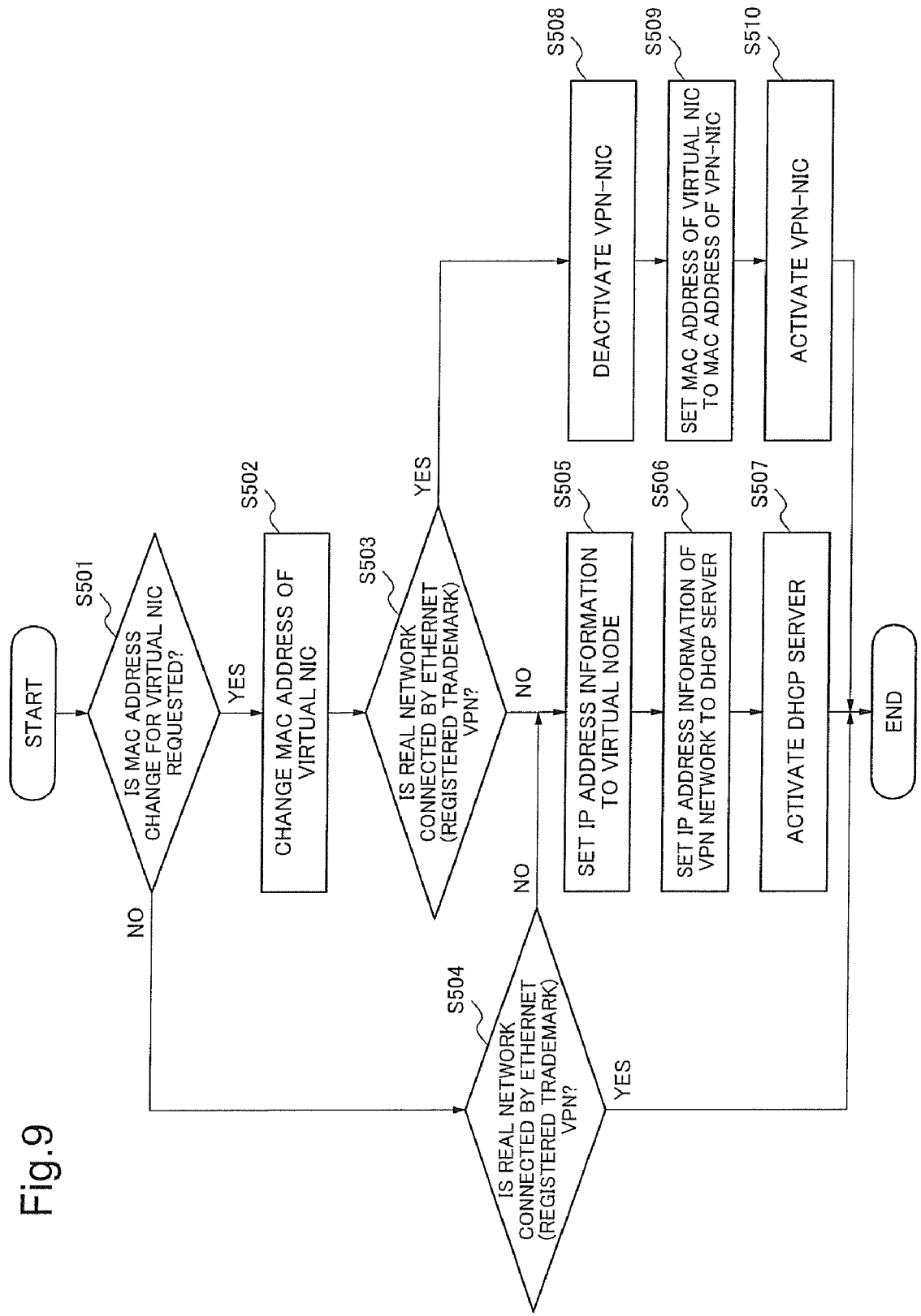
FIG. 9 is a flowchart showing process operation of the virtual NIC activation for a VPN connection.

FIG. 9 is a flowchart of operation performed by the network setting and communication control part 100 with its component when the user VM environment 20 starts its operation and the virtual NIC 700 is activated in case of the VPN connection. This operation corresponds to FIG. 4 of the first exemplary embodiment, and similar to the first exemplary embodiment, in this operation, the network setting and communication control part 100 performs various information setting necessary for the user VM environment 20 to perform communication through the VPN connection with an external network via the service VM environment 10.

(1) Step S501

First, it determines whether the user VM environment 20 is requesting change in the MAC address of the virtual NIC 700. Generally, as a MAC address to be assigned to an ordinary NIC, a certain of value is given as the MAC address of the NIC at the time of manufacturing the NIC (or given at the time of generating the NIC in case of the virtual system). However, it is possible that the operating system (OS) designates a value of the MAC address and changes the MAC address of the NIC. Here, the network setting and communication control part 100 determines whether the user VM environment 20 is requesting change in the MAC address of the virtual NIC 700. At that time, the virtual NIC setting unit 120 receives a request of change in the MAC address from the virtual NIC 700 via the virtual node 400. Further, Step S501 and Step S502 are the same process steps as Step S301 and Step S302 of FIG. 4 respectively.

(2) Step S502

When the user VM environment 20 is requesting change in the MAC address of the virtual NIC 700, the virtual NIC setting unit 120 changes the designation of MAC address for the virtual NIC 700 to the value which the user VM environment 20 has designated.

(3) Step S503

Next, the network setting and communication control part 100 determines whether the real network is connected by the Ethernet (registered trademark) VPN. The network setting and communication control part 100 acquires information on whether the real network is connected by the Ethernet (registered trademark) VPN from the real network processing part 500 when a VPN node is connected. Step S503 is the corresponding conditional branch to Step S303 of FIG. 4, and it determines whether the connection on the real network is the Ethernet (registered trademark) VPN. Here, the virtual node setting unit 110 acquires information which indicates whether the real network is connected by the Ethernet (registered trademark) VPN from the real network processing part 500 when the real network processing part 500 is connected to the VPN node. When the connection is the Ethernet (registered trademark) VPN, by the process steps of Steps S508-S510, the real NIC setting unit 130 changes a value of MAC address of NIC (VPN-NIC) of the VPN node to the same value as the MAC address of the virtual NIC 700 which was changed in the previous step of S502.

(4) Step S504

It is the same conditional branch as Step S503. The network setting and communication control part 100 acquires information on whether the real network is connected by the Ethernet (registered trademark) VPN from the real network processing part 500. Here, the virtual node setting unit 110 acquires information which indicates whether the real network is connected by the Ethernet (registered trademark) VPN from the real network processing part 500 when the real network processing part 500 is connected to the virtual NIC 700. When the real network is connected by the Ethernet (registered trademark) VPN, nothing is performed in particular.

(5) Step S505

When the real network is not connected by the Ethernet (registered trademark) VPN, the network setting and communication control part 100 activates operation on the network layer by setting IP address information to the virtual node 400 by the virtual node setting unit 110. In this case, the IP address information to be set to the virtual node 400 should be a different IP address with the same network address of the IP address used in the VPN network, and this is selected appropriately by the real network processing part 500 or the like. Although it is the same process step as Step S307 of FIG. 4, it is different in a point using the IP address information of the VPN network instead of the IP address information of the real network. The VPN network is a network which forms the virtual private network (VPN).

(6) Step S506

By using the DHCP server setting unit 150, the network setting and communication control part 100 sets the IP address information of the VPN node to the DHCP server 300 as IP address information to be distributed by the DHCP server 300. The network setting and communication control part 100 limits a target, to which the DHCP server 300 distributes the IP address information, only to the virtual NIC 700. However, in case where the connection on the real network is the Ethernet (registered trademark) VPN, the DHCP server 300 is not necessary because the VPN node does not have IP address information and the virtual NIC 700 can obtain IP address information through the VPN connection.

(7) Step S507

The DHCP server setting unit 150 starts the DHCP server 300 to operate. As a result, when activation of the virtual NIC 700 is completed after this, the DHCP client 800 of the user VM environment 20 acquires IP address information from the DHCP server 300 by using the DHCP protocol. It is the same processing as Step S309 of FIG. 4.

(8) Step S508

When the connection on the real network is the Ethernet (registered trademark) VPN, the real NIC setting unit 130 deactivates an NIC (VPN-NIC) used for the VPN node to perform the following process step for changing the MAC address of the NIC (VPN-NIC).

(9) Step S509

The real NIC setting unit 130 sets the same value as the MAC address of the virtual NIC 700 to the definition of MAC address for the NIC (VPN-NIC) of the VPN node.

(10) Step S510

The real NIC setting unit 130 activates again the NIC (VPN-NIC) of the VPN node. As a result, the MAC address of the NIC (VPN-NIC) of the VPN node becomes identical to the MAC address of the virtual NIC 700, i.e., both of the MAC address of the virtual NIC 700 and the NIC (VPN-NIC) of the VPN node contain the same value.

Next, the third exemplary embodiment will be described.

In FIG. 1, number of the real NIC 600 provided in the system is one, and also number of the virtual NIC 700 is one which is corresponding to the real NIC 600. However, the number of the real NIC 600 to be provided may be plural. Each communication system corresponding to each NIC 600 may be different respectively. In this case, the same number of virtual NIC 700 as the number of real NIC 600 can be defined. All virtual NIC 700 may be included in one user VM environment 20, or each virtual NIC 700 may be dispersed in a plurality of user VM environments 20. Also, with respect to the VPN node to be connected, there may be a plurality of VPN nodes. Further, there is a plurality of network interface cards (NIC), and a plurality of VPN nodes may exist simultaneously.

In the virtual system of the present invention, although the hypervisor 30 and the service VM environment 10 are separated each other, these may be united. The service VM environment 10 may be divided into plural units.

The features of the invention will be described below.

The present invention provides a virtual machine which can realize communication processing necessary for communicating with an external network by the service VM, not by the user VM which is an environment used by users. That is, the communication processing necessary for communicating with the external network is separated from the user VM.

The present invention provides a virtual machine having a single virtual communication interface by using Ethernet (registered trademark) for the user VM. Therefore, when the communication system employed on the data link layer of the real network is Ethernet (registered trademark), a user environment can see the Ethernet (registered trademark) environment of communication in spite of a part of the communication processing being separated from the user environment.

Owing to the same reason above, even if the communication system employed on the data link layer of the real network is not Ethernet (registered trademark), the user environment can perform a communication using the Ethernet (registered trademark) environment as a single virtual communication interface for the user VM. Further, when the virtual private network (VPN) communication is used in the real network, the user environment can also perform a communication using the Ethernet (registered trademark) environment as a single virtual communication interface for the user VM.

Although the present invention has been described for the portable computer, the present invention is also applicable to computers other than the portable type and equipment such as PDA (Personal Data Assistance) and cellular phones.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A virtual system, which realizes virtual computing environments for performing communication processing, wherein the virtual system includes a service virtual machine which controls real physical communication devices and management interfaces of the virtual system and a user virtual machine which is the virtual machine operated by users and includes a virtual network interface card (NIC) for connecting to a real physical network through the service virtual machine and a real physical NIC, comprising:

a virtual node which is provided as an opposed node of the virtual NIC and performs control processing necessary for an interface conversion process for the communication between the real physical network and the user virtual machine;

a virtual node setting unit which acquires information regarding whether a data link layer communication system employed in the real physical network which is connected by the real physical NIC is the same as the communication system of the user virtual machine, and performs control processing for setting the virtual node;

a virtual NIC setting unit which acquires a Media Access Control (MAC) address given to the real physical NIC when the data link layer communication system employed in the real physical network is the same as the communication system of the user virtual machine, defines the acquired MAC address to the virtual NIC, and performs control processing for setting the virtual NIC; and, a real physical NIC setting unit which changes the MAC address of the real physical NIC to the MAC address of the virtual NIC when the MAC address change is requested by the user virtual machine in a start operation of the user virtual machine, and performs control processing for setting the real physical NIC.

2. The virtual system according to claim 1, wherein, in case where the data link layer communication system employed in the real physical network is the same as the communication system of the user virtual machine, said virtual node setting unit sets the virtual node to frame processing mode, which does not perform the interface conversion process for the communication between the real physical network and the user virtual machine, before starting the user virtual machine.

3. The virtual system according to claim 2, further comprising:

a proxy ARP which provides the MAC address of the real physical NIC as a response to a request based on an address resolution protocol (ARP) from the user virtual machine; and, a proxy ARP setting unit which sets the proxy ARP, wherein, in case where the data link layer communication system employed in the real physical network is not the same as the communication system of the user virtual machine, said virtual node setting unit sets the virtual node to IP packet processing mode, which performs the interface conversion process for the communication between the real physical network and the user virtual machine, before starting the user virtual machine;

said proxy ARP setting unit activates operation of the proxy ARP after the virtual node being set to the TP packet mode, and said virtual NIC setting unit sets the virtual NIC so that the MAC address is not set to the virtual NIC.

4. The virtual system according to claim 3, further comprising:

a DHCP (Dynamic Host Configuration Protocol) server which is dedicatedly used by the virtual NIC and distributes IP address information only to the virtual NIC; and a DHCP server setting unit which sets IP address information of the real physical network to the DHCP server as the IP address information to be distributed to the virtual NIC, and activates operation of the DHCP server.

5. The virtual system according to claim 4, further comprising:

an outward communication control unit which handles communication transmitted from the virtual NIC, judges whether an outward frame of the data link layer communication from the virtual NIC is address resolution protocol (ARP) communication, determines destination of the outward frame as the proxy ARP if the outward frame is the address resolution protocol (ARP) communication, and transmits the outward frame to the proxy ARP via the virtual node.

6. The virtual system according to claim 5, wherein, said outward communication control unit judges whether the outward frame is DHCP communication if the outward frame is not the address resolution protocol (ARP) communication, judges whether the DHCP server is activating state if the outward frame is the DHCP communication, determines destination of the outward frame as the DHCP server if the DHCP server is activating state, and transmits the outward frame to the DHCP server, via the virtual node.

7. The virtual system according to claim 6, wherein, said outward communication control unit extracts the IP packet from the outward frame if the destination is not any of the proxy ARP and the DHCP server and the virtual node is the IP packet processing mode, and transmits the extracted IP packet to the real physical network via the virtual node.

8. The virtual system according to claim 7, further comprising:

an inward communication control unit which handles communication transmitted to the virtual NIC, when the virtual node is the frame processing mode and a destination address of an inward frame of the data link layer communication from the real physical network is a broadcast address, performs filtering process so that the inward frame not to reach the DHCP server, and transmits the inward frame to the virtual NIC.

9. A method in a virtual system, which realizes virtual computing environments for performing communication processing, wherein the virtual system includes a service virtual machine which controls real communication devices and management interfaces of the virtual system and a user virtual machine which is the virtual machine operated by users and includes a virtual network interface card (NIC) for connecting to real network through the service virtual machine and a real physical NIC, comprising:

a virtual node providing step for providing a virtual node as an opposed node of the virtual NIC and to perform control processing necessary for an interface conversion process for the communication between the real network and the user virtual machine;

a virtual node setting step for acquiring information regarding whether a data link layer communication system employed in the real network which is connected by the real NIC is the same as the communication system of the user virtual machine, and performing control processing for setting the virtual node a virtual NIC setting step for acquiring a Media Access Control (MAC) address given to the real NIC when the data link layer communication system employed in the real network is the same as the communication system of the user virtual machine, defining the acquired MAC address to the virtual NIC, and performing control processing for setting the virtual NIC; and a real NIC setting step for changing the MAC address of the real NIC to the MAC address of the virtual NIC when the MAC address change is requested by the user virtual machine in a start operation of the user virtual machine, and performing control processing for setting the real NIC.

10. The method in the virtual system according to claim 9, wherein, in case where the data link layer communication system employed in the real physical network is the same as the communication system of the user virtual machine, said virtual node setting step sets the virtual node to frame processing mode before starting the user virtual machine, which does not perform the interface communication process for the communication between the real physical network and the user virtual machine; and, said virtual NIC setting step acquires the MAC address given to the real physical NIC before starting the user virtual machine, and sets the acquired MAC address to the MAC address of the virtual NIC.

11. The method in the virtual system according to claim 10, further comprising:

a proxy ARP setting step for setting a proxy ARP which responds the MAC address of the real physical NIC as a response to a request based on an address resolution protocol (ARP) from the user virtual machine, and wherein, in case where the data link layer communication system employed in the real physical network is not the same as the communication system of the user virtual machine, said virtual node setting step sets the virtual node to IP packet processing mode, which performs the interface conversion process for the communication between the real physical network and the user virtual machine, before starting the user virtual machine;

said proxy ARP setting step activates operation of the proxy ARP after the virtual node being set to the 1-13 packet mode, and said virtual NIC setting step sets the virtual NIC so that the MAC address is not set to the virtual NIC.

12. The method in the virtual system according to claim 11, further comprising:
   a DHCP setting step for setting IP address information of the real physical network to a DHCP (Dynamic Host Configuration Protocol) server, which is dedicatedly used by the virtual NIC and distributes IP address information only to the virtual NIC, as the IP address information to be distributed to the virtual NIC, and activating operation of the DHCP server.

13. The method in the virtual system according to claim 12, further comprising:
   an outward communication control step for handling communication transmitted from the virtual NIC, judging whether an outward frame of the data link layer communication from the virtual NIC is address resolution protocol (ARP) communication, determining destination of the outward frame as the proxy ARP if the outward frame is the address resolution protocol (ARP) communication, and transmitting the outward frame to the proxy ARP via the virtual node.

14. The method in the virtual system according to claim 13, wherein,
   said outward communication control step judges whether the outward frame is DHCP communication if the outward frame is not the address resolution protocol (ARP) communication, judges whether the DHCP server is activating state if the outward frame is the DHCP communication, determines destination of the outward frame as the DHCP server if the DHCP server is activating state, and transmits the outward frame to the DROP server via the virtual node.

15. The method in the virtual system according to claim 14, wherein,
   said outward communication control step extracts the IP packet from the outward frame if the destination is not any of the proxy ARP and the DHCP server and the virtual node is the IP packet processing mode, and transmits the extracted IP packet to the real physical network via the virtual node.

16. The method in the virtual system according to claim 15, further comprising:
   an inward communication control step for handling communication transmitted to the virtual NIC, when the virtual node is the frame processing mode and a destination address of an inward frame of the data link layer communication from the real physical network is a broadcast address, performing filtering process so that the inward frame not to reach the DHCP server, and transmitting the inward frame to the virtual NIC.

17. A non-transitory computer data storage readable medium having a virtual system control program stored thereon to control a virtual system upon execution of the virtual system control program by a processing device, such that virtual computing environments are realized for performing communication processing, wherein the virtual system includes a service virtual machine which controls real physical communication devices and management interfaces of the virtual system and a user virtual machine which is the virtual machine operated by users and includes a virtual network interface card (NIC) for connecting to a real physical network through the service virtual machine and a real physical NIC, for causing a processing device to execute the method comprising:
   a virtual NIC setting step for acquiring a Media Access Control (MAC) address given to the real physical NIC when the data link layer communication system employed in the real physical network is the same as the communication system of the user virtual machine, defining the acquired MAC address to the virtual NIC, and performing control processing for setting the virtual NIC;
   a real physical NIC setting step for changing the MAC address of the real physical NIC to the MAC address of the virtual NIC when the MAC address change is requested by the user virtual machine in a start operation of the user virtual machine, and performing control processing for setting the real physical NIC;
   wherein in case where the data link layer communication system employ in the real physical network is the same as the communication system of the user virtual machine,
   a virtual node providing step for providing a virtual node as an opposed node of the virtual NIC and to perform control processing necessary for an interface conversion process for the communication between the real physical network and the user virtual machine;
   a virtual node setting step for acquiring information regarding whether a data link layer communication system employed in the real physical network which is connected by the real physical NIC is the same as the communication system of the user virtual machine, and performing control processing for setting the virtual node.

18. The non-transitory computer readable medium having a virtual system control program stored thereon according to claim 17, further comprising:
   a proxy ARP setting step for setting a proxy ARP which responds the MAC address of the real physical NIC as a response to a request based on an address resolution protocol (ARP) from the user virtual machine,
   wherein, in case where the data link layer communication system employed in the real physical network is not the same as the communication system of the user virtual machine,
   said virtual node setting step sets the virtual node to IP packet processing mode, which performs the interface conversion process for the communication between the real physical network and the user virtual machine, before starting the user virtual machine;
   said proxy ARP setting step activates operation of the proxy ARP after the virtual node being set to the IP packet mode, and
   said virtual NIC setting step sets the virtual NIC so that the MAC address is not set to the virtual NIC.

19. The non-transitory computer readable medium having a virtual system control program stored thereon according to claim 18, further comprising:
   a DHCP server setting step for setting IP address information of the real physical network to a DHCP (Dynamic Host Configuration Protocol) server, which is dedicatedly used by the virtual NIC and distributes IP address information only to the virtual NIC, as the IP address information to be distributed to the virtual NIC, and activating operation of the DHCP server.

20. The non-transitory computer readable medium having a virtual system control program stored thereon according to claim 19, further comprising:
   an outward communication control step for handling communication transmitted from the virtual NIC, judging whether an outward frame of the data link layer communication from the virtual NIC is address resolution protocol (ARP) communication, determining destination of the outward frame as the proxy ARP if the outward frame is the address resolution protocol (ARP) communication, and transmitting the outward frame to the proxy ARP via the virtual node.

21. The non-transitory computer readable medium having a virtual system control program stored thereon according to claim 20, wherein,
   said outward communication control step judges whether the outward frame is DHCP communication if the outward frame is not the address resolution protocol (ARP) communication, judges whether the DHCP server is activating state if the outward frame is the DHCP communication, determines destination of the outward frame as the DHCP server if the DHCP server is activating state, and transmits the outward frame to the DHCP server via the virtual node.

22. The non-transitory computer readable medium having a virtual system control program stored thereon according to claim 21, wherein,
   said outward communication control step extracts the IP packet, from the outward frame if the destination is not any of the proxy ARP and the DHCP server and the virtual node is the IP packet processing mode, and transmits the extracted IP packet to the real physical network via the virtual node.

23. The non-transitory computer readable medium having a virtual system control program stored thereon according to claim 22, further comprising:
   an inward communication control step for handling communication transmitted to the virtual NIC, when the virtual node is the frame processing mode and a destination address of an inward frame of the data link layer communication from the real physical network is a broadcast address, performing filtering process so that the inward frame not to reach the DHCP server, and transmitting the inward frame to the virtual NIC.

* * * * *